United States Patent [19]

Harris et al.

[11] Patent Number: 4,524,681

[45] Date of Patent: Jun. 25, 1985

[54] METHODS AND APPARATUS FOR THERMAL BLAST FEELING, SKINNING, OR SHELLING OF FOOD PRODUCTS

[75] Inventors: Hubert Harris; Durward A. Smith, both of Auburn, Ala.

[73] Assignee: Auburn Research Foundation, Auburn, Ala.

[21] Appl. No.: 621,739

[22] Filed: Jun. 18, 1984

Related U.S. Application Data

[62] Division of Ser. No. 554,814, Nov. 23, 1983.

[51] Int. Cl.$^3$ .............................................. A23N 7/00
[52] U.S. Cl. ....................................... 99/474; 99/479; 99/483; 99/516; 99/584
[58] Field of Search ............ 99/348, 410, 356, 474, 99/359, 584, 483, 479, 467–472, 516, 568, 539, 540, 629–634; 426/480–483; 366/105, 220, 144, 145, 147–149

[56] References Cited

U.S. PATENT DOCUMENTS

| | | | |
|---|---|---|---|
| 3,971,303 | 7/1976 | Dahl | 99/323.4 |
| 4,064,794 | 12/1977 | Kunz | 99/584 X |
| 4,091,722 | 5/1978 | Kunz | 99/467 X |
| 4,393,756 | 7/1983 | van der Schoot | 99/584 X |

Primary Examiner—Timothy F. Simone
Attorney, Agent, or Firm—Sherman & Shalloway

[57] ABSTRACT

This disclosure embodies an apparatus and process for the rapid removal of outer coverings and other unedible portions from food products with minimal loss of or damage to edible portions. The process has proven to be effective in the peeling of fruit and vegetable crops, coring peppers, shelling of legume seed pods, shucking and silking corn, popping corn, skinning onions, shelling of nut crops, scaling and skinning of fish, and removal of shells from shellfish. These processes are accomplished with an apparatus which heats the surface of the product very rapidly in an atmosphere of superheated steam under elevated pressure, supplemented with radiant heat from a vessel wall, and then flashes to atmospheric pressure by instantaneous opening of the vessel cover. The result is an explosion which blows the product from the vessel and simultaneously blasts the covering from the product by violent action of highly energized moisture beneath the product covering. In the particular case of the pimiento and bell peppers, the unedible core is also blown free of the edible pod during the thermal blast treatment. Suitable means are provided for catching the product as it leaves the vessel.

23 Claims, 11 Drawing Figures

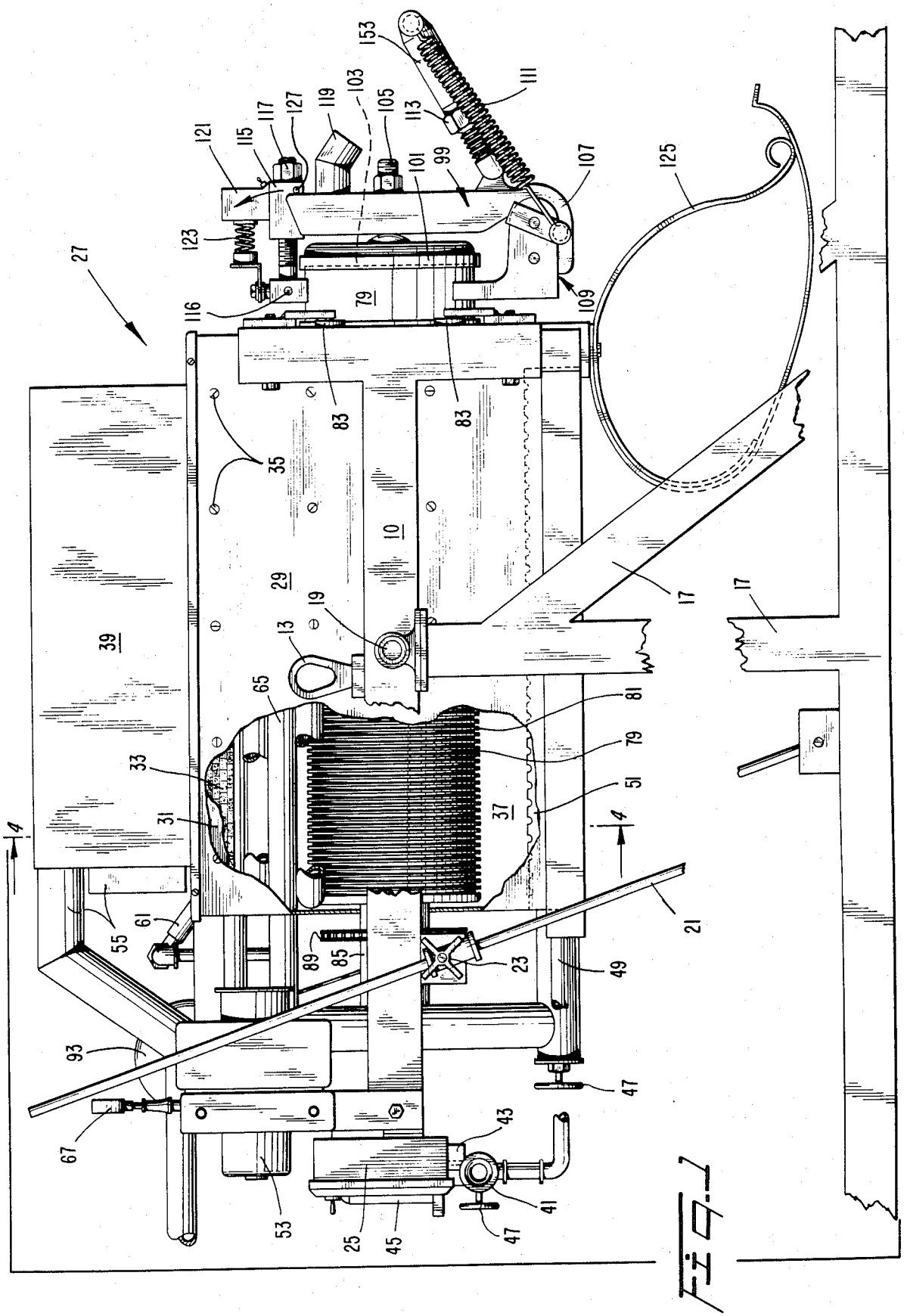

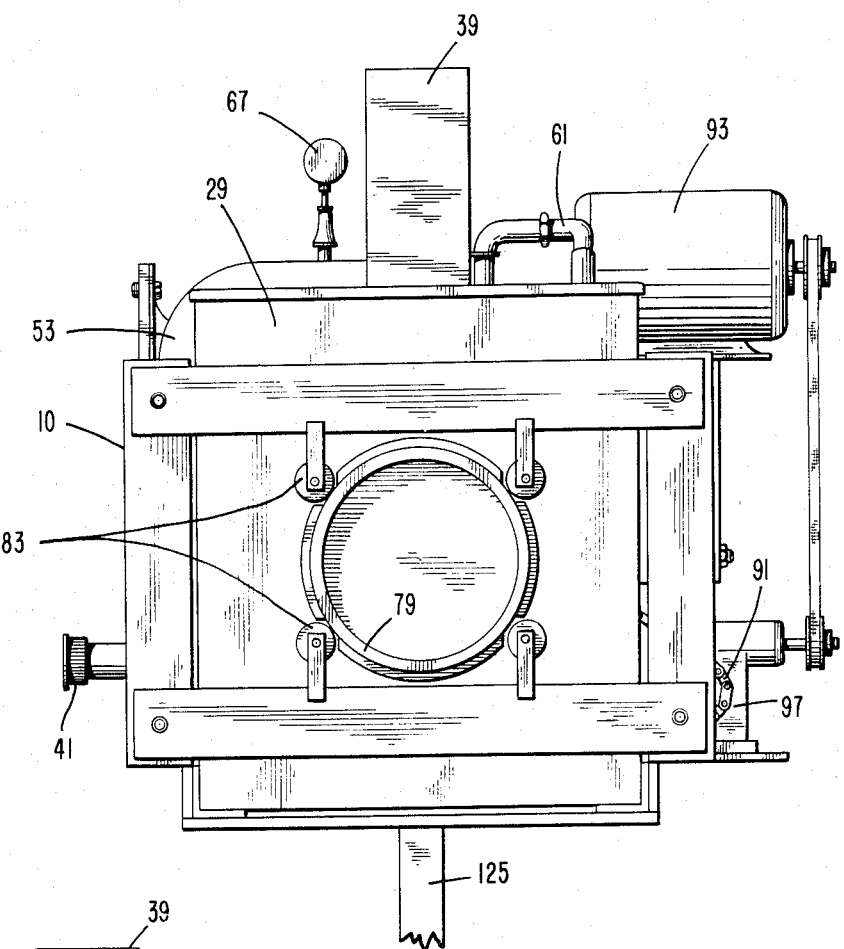
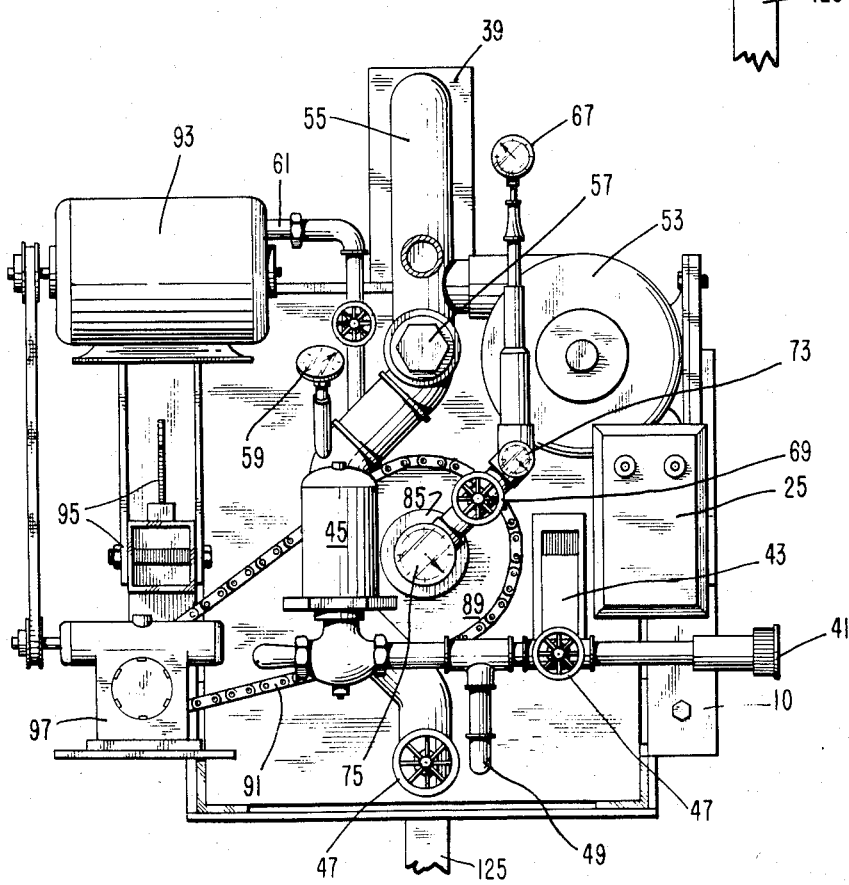

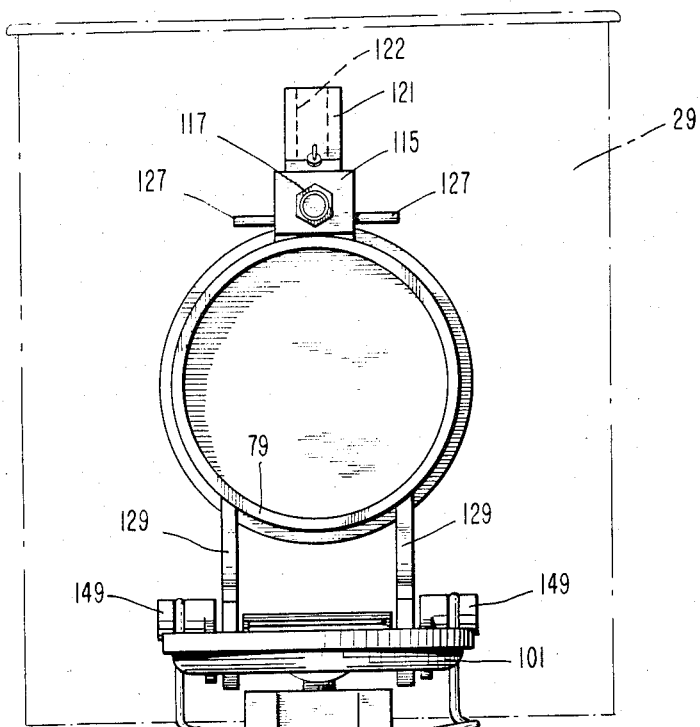
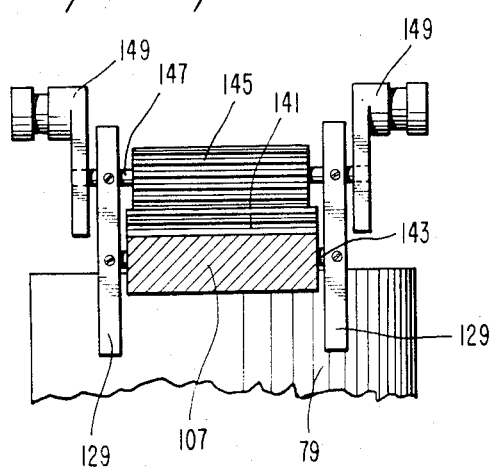
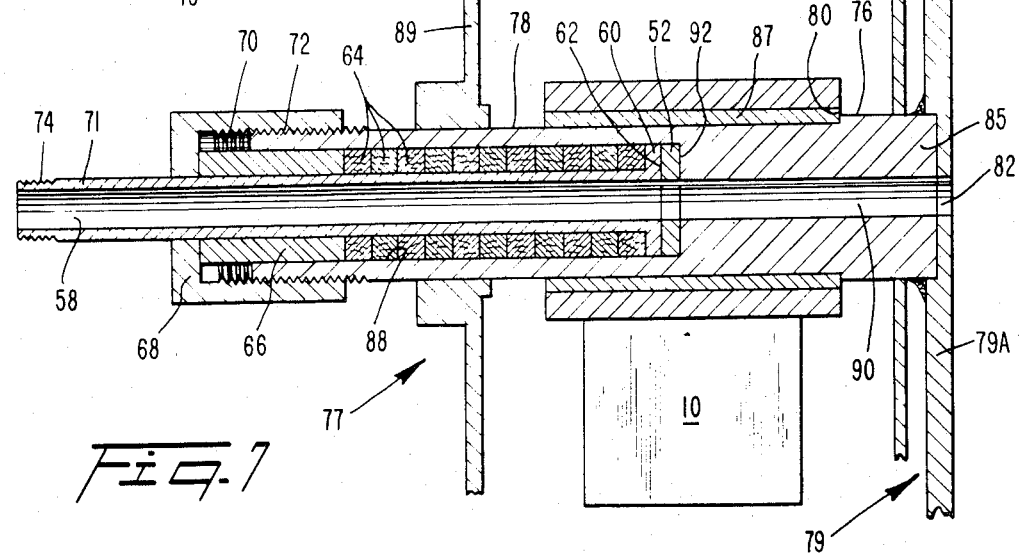

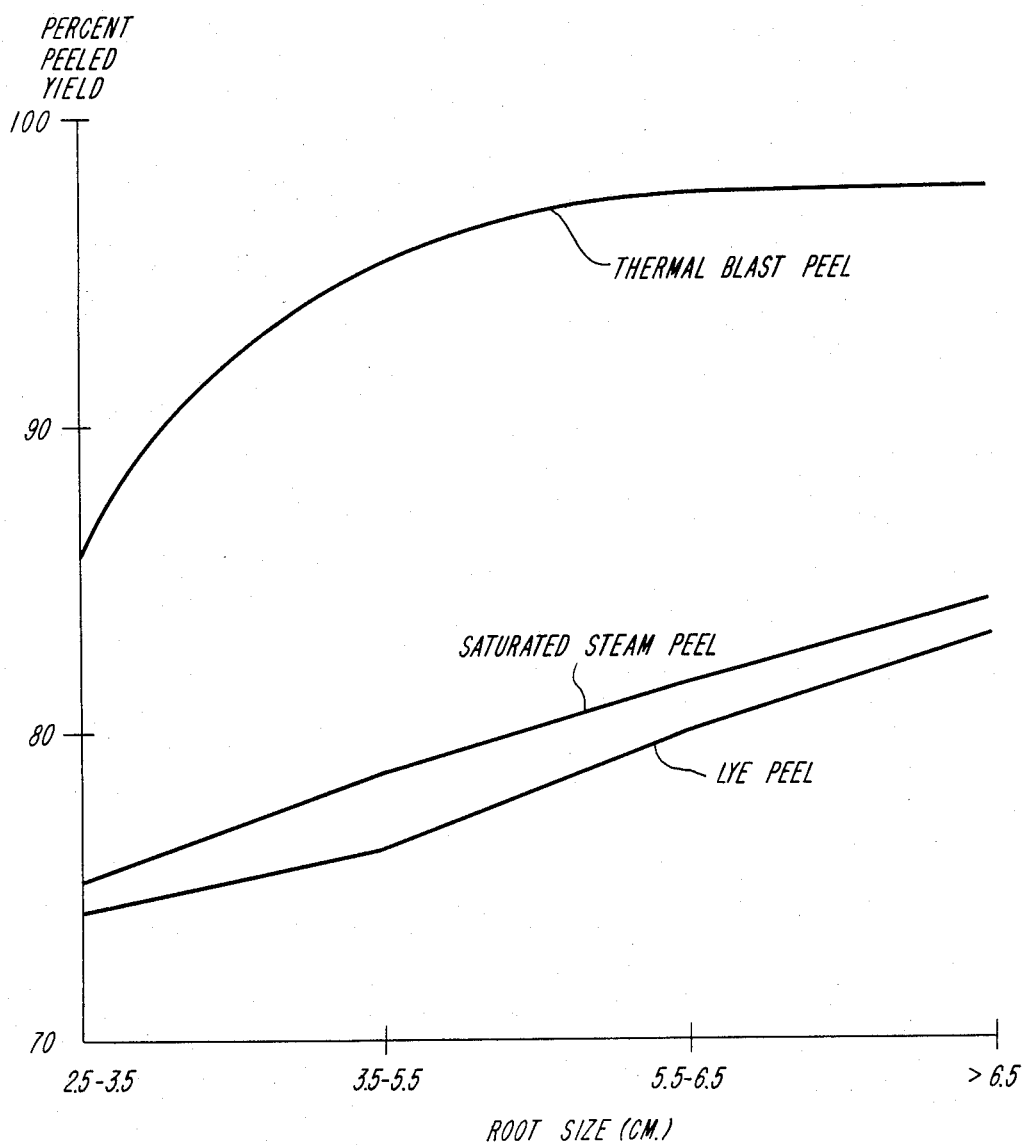

METHODS AND APPARATUS FOR THERMAL BLAST FEELING, SKINNING, OR SHELLING OF FOOD PRODUCTS

This is a divisional of application Ser. No. 554,814, filed Nov. 23, 1983.

BACKGROUND OF THE INVENTION

Most of man's foods in the natural state are protected with a covering of one kind or another. Examples are the peel tissues of fruits and vegetables, hulls of legume seed pods, shuck covering of corn ears, skins of onions, shells of nuts, scales of fish, and the calcareous coverings of shellfishs. In most cases, these coverings are considered to be unedible and are therefore eliminated when preparing the product for human consumption.

DESCRIPTION OF THE PRIOR ARTS

The food industry currently employs a variety of methods and techniques for removing the unedible surface coverings from food products. The exact method or combination of methods used varies with the product to be processed, size of operation and other factors. Methods and techniques currently in use include mechanical peeling with power operated knives, abrasive peeling, flame peeling, scalding, mechanical shelling of legume crop, mechanical cracking of nuts, mechanical shelling of shrimp. Adequate washing and varying amounts of scrubbing, sorting, and hand trimming are required to complete the operations.

The thermal blast process as disclosed herein is distinctively different from any of the current commercial processes. It is related to conventional pressurized steam peeling in that steam is utilized in both processes. The manner in which the steam is utilized and the end results are vastly different. These differences become apparent in the following descriptions of current commercial steam peeling methods.

There are two common commercial types of steam peeling apparatus. In the first of these methods, vegetables are charged through a rotary-type sluice gate batcher into a hermetically sealed chamber and are processed under a pressure of 50-90 psig (3.5-6.3 Kg/cm$^2$) during 40-90 seconds. While being processed by steam, the vegetables are displaced along the chamber by a screw conveyor, from the point of charging to the point of discharge. The vegetables are then discharged through a sluice gate batcher into a washing and peeling machine in which they are mechanically peeled (FMC Continuous High Pressure Steamers Models 140 and 240 FMC Catalog (1980) pp. 49–50). The second peeling method utilizes a high pressure batch-type steam vessel which is filled from above, purged with steam for several seconds and hermetically sealed prior to a gradual pressure build up. Pressures up to 300 psig (21. Kg/cm$^2$) during 20-60 seconds are used. The exhaust valve is then opened requiring several seconds for the pressure to gradually fall, and before the discharge hatch can be opened. The produce is then discharged on a conveyor and is conveyed to a washer where the peeling is mechanically completed (U.S. Pat. No. 4,091,722). A further steam peeling method has been described, but is not utilized by the industry, whereby the produce to be peeled is conveyed by gravity through a system of chambers separated by hydraulically actuated gate valves. In the process, the produce moves from an atmospheric chamber to a low pressure steam environment to a vacuum chamber (U.S. Pat. No. 3,759,166).

The prior methods and apparatus for processing vegetables by steam are disadvantageous because following processing and due to slow venting of the pressure vessel the surface layers of the produce are excessively heated. The heat continues penetrating inside, thereby increasing the depth of the layer being treated, which results in large amounts of by-product and correspondingly higher peeling and trimming losses. These methods are most applicable for processing vegetables of a hard consistency (potatoes for example). Fruits and vegetables of delicate consistency are not well peeled because they quickly begin to cook and become soft, and/or are sensitive to high pressures which disrupt their structural integrity. The heat involved in these methods is not sufficiently intense to superheat the water within the relatively thick shells of nuts and/or the pressure is released to slowly to explode the shell away from the nut. The following prior U.S. patents are also known to applicants: U.S. Pat. Nos. 1,243,724, 1,433,928, 1,793,711, 1,910,749, 2,806,501, 2,873,220, 3,128,690, 3,225,804, 3,276,495, 3,605,843, 3,714,886, 3,880,066, 3,959,506, and 4,222,322.

SUMMARY OF THE INVENTION

The present apparatus consists essentially of a cylinder (processing chamber) mounted suitably for axial rotation in a horizontal position inside an insulated gas furnace. The cylinder is equipped for steam inlet from the back end, and for charging and discharging the product from the front end which extends outside the furnace included therewith. While in rotation, the finned external surface of the cylinder is heated rapidly by direct contact with the flame from the furnace burner. Steam for the heat-blast process is superheated by passage through coils which are also located inside the furnace. The steam passes from these coils into the rotating cylinder by means of a packed, swivel joint. A special gasket-sealed heat to the cylinder, equipped with a trip latch closing mechanism, provides for pressurization of the cylinder and for instantaneous depressurization to create the blast process.

This invention further embodies a novel process for the rapid removal of outer coverings from food products with minimal damage to edible portions of the product. These results are achieved by the employment of a heat-blast treatment with superheated steam or high temperature gases. The process has proven to be very effective in removing the outer coverings from many products. In some cases it has also aided substantially in the removal of other unedible portions such as: cores from pimiento peppers; "rag" from pecans; fins, heads, and entrails of fish and shellfish; or silks from corn.

The blast process is accomplished by holding the product for a brief in a heated, closed vessel filled with superheated steam under elevated pressure, and then instantaneously releasing the pressure. During the holding period, thermal energy is transferred at a very fast rate to the moisture beneath the outer covering of the product. The very fast heating rate results from simultaneous exposure of the product surface to two sources of heat; namely direct contact with pressurized, superheated steam and radiant heat from the hot vessel walls. Use of the radiant heat to supplement the steam heat is a significant feature of the thermal blast process. For example, the vessel walls may be maintained at approximately 900° F. when the superheated steam is supplied at approximately 600° F. The heat moves at a very fast rate from the relatively dry outer surface of the product to moisture immediately beneath the surface. Becoming highly energized, this moisture flashes to the vapor state when the pressure surrounding the product is suddenly released. The rapidly expanding vapor causes an explosive process which blasts the outer peel, pod, shuck, skin, scale, or shell from the product under treatment. The very rapid rate of heating and the instantaneous cessation of heating by the blast process provide the conditions necessary for accurate control of the depth of the layer removed. Loss of edible portion is minimal and the exposed surface is smooth and attractive. In addition to removing the outer covering, products that have an internal cavity may also accumulate enough steam inside the cavity to blast out unedible portions such as the core of pimiento pepper or the "rag" of pecans.

The thermal blast process is, in reality, a phenomeon based on the thermodynamic properties of water. When the essential conditions are met, an explosion results which blasts the covering from the product.

The thermal blast process has proven to be effective in removing the covering from a wide variety of food products including fruits, vegetables, nuts, fish, and shellfish. By varying the temperature and/or time of heating, excellent results have been obtained in removing coverings ranging from the very thin peel of a ripe peach to the relatively thick peel of an orange. Moistness of the area immediately beneath the covering is also important. When processing products that are relatively dry in this area, better results are usually obtained by preceeding the thermal blast process with a water soak or a submerged vacuum treatment to increase the moisture level in the area beneath the covering. Special treatments have also been developed to aid in the removal of unedible portions from internal cavities during the thermal blast process. Other conditions required for the success of the process are: a means of transmitting heat uniformly to the product surface at a fast rate while the product is held under pressure, and for instantaneously releasing the pressure at the end of the heat treatment.

The uniqueness of the thermal blast process is quite apparent when it is compared with other methods in general use for removing the outer coverings from food products. Following are examples of these unique features:

1. The principal of the thermal blast method is different from other methods. Removal of outer coverings by conventional methods is accomplished by (a) cutting it away with a knife, (b) grinding it away by an abrasive process, (c) charring the surface with a flame followed by washing, (d) heating with steam or hot water followed by scrubbing and washing, (e) heating in a chemical solution such as sodium hydroxide followed by washing, (f) mechanical thrashing of legumes, (g) mechanical cracking of nuts or, (h) mechanical removal of scales from fish and shells from shellfish. None of these methods apply heat to the surface in a manner that moisture underneath the surface is highly energized while the surface is held in place by external pressure, and then instantaneously releasing the pressure to create an explosive process under the covering to blast it away.

2. None of the conventional methods utilize both radiant heating and high temperature steam contact heating simultaneously in surface heating of the product. In the case of direct flaming, heat is transmitted to the product surface at a fast rate, but the process is carried out in air at atmospheric pressure which causes the surface to quickly dry to a low moisture level and finally to burn without a high concentration of heat energy beneath the surface.

3. The thermal blast process is faster than conventional methods. While the exact conditions vary with product, the steam surrounding the product may be superheated to a temperature as high as 1000° F. and/or the heat period may be no more than 3 seconds. The treatment is then instantaneously terminated by triggering the blast process. This rapidly heats the surface area as needed for an effective process without overheating the edible portions causing high peeling losses and/or oxidative heat rings beneath the peeled surface.

4. The thermal blast process is potentially more useful than any of the conventional methods. It has proven to be effective in removing outer coverings from a wide variety of food products including fruits, vegetables, nuts, fish, and shellfish. Included with the vegetables are certain soft products such as tomatoes which have been peeled very satisfactorily without damage to the textural integrity of the product. By comparison, conventional methods are limited in adaptation to one or two products, or to only a few at the most. The thermal blast process is highly effective on most products that have a distinct outer covering over moist edible portions, provided the covering separates readily when the surface is sufficiently heated and surrounding pressure is released. This is true whether the covering is a peel, pod, shuck, skin, scale or shell. In addition to removing outer coverings, the thermal blast process is effective in removing other unedible portions such as the cores from pimiento peppers or the "rag" from pecan nuts. None of the conventional methods have this wide of a range of application.

5. The thermal blast process is more effective than the conventional methods in removing coverings from irregular or contoured surfaces including eyelets and surface defects. It also leaves the product with an attractive smooth surface that is not furrowed by knife marks, bruised by an abrasive treatment, scorched by contact with a flame, or covered with a chemical residue.

6. The hand trimming effort is reduced and simplified by the thermal blast process (as compared with conventional methods). In the first place, the heat depth is accurately controlled so the product surface is not overheated to the extent that the surface becomes slippery and difficult to handle. Secondly, the process is very effective in removing outer covering, leaving fewer blemishes to be removed by hand trimming.

7. Processing losses are minimized by the thermal blast process because of the uniformity of the blast treatment over irregular surfaces, reduced hand trimming, and control of depth of heat treatment.

8. Waste disposal and environmental pollution are reduced by the thermal blast process in comparison with conventional methods because of the reduction in the amount of waste products, the dryness of the resultant wastes, and the absence of a strong chemical residue to be disposed of.

9. The thermal blast process compares favorably with conventional methods in energy consumption. The process apparatus includes a special energy efficient furnace which utilizes a 3-step counter flow heat exchange system. First, the furnace burner delivers heat to the rotating processing chamber by direct flame contact with its finned outer surface. Then, as the products of combustion rise in the combustion chamber, they deliver heat to the system's steam superheater coils which are located in the upper section of this chamber, and finally, to another set of coils located in the furnace vent for preheating the air supply to the furnace burner. This efficient system of direct furnace heating substantially reduces the requirements for boiler steam. The very short heat treatment applied to the product is also comparatively conservative in energy use.

10. The thermal blast process provides good protection against certain enzyme problems. The heat treatment is adequate to provide surface blanching which protects the exposed product surface from rapid enzymatic discoloration, but the heat does not penetrate deep enough to cause dark heat rings below the surface which may be a series problem with other methods.

11. The surface heat treatment of the thermal blast process provides protection against surface contamination which may be a problem when no heat is used.

12. A final and very important unique feature of the thermal blast process is its potential for products for which there are presently no satisfactory commercial methods available for removal of the outer covering (for example, Brazil nuts and rock shrimp); or for which improved methods are urgently needed (for example, apples and pears). The thermal blast process has proven to be effective on these products and offers excellent potential for processing them on a commercial basis. Other similar potential have been discovered and still others will, no doubt, be discovered as the process is explored more extensively.

Accordingly, it is a first object of the present invention to provide a thermal blast apparatus including a rotary vessel mounted in heat exchange relation with a furnace.

It is a further object of the present invention to provide a thermal blast apparatus wherein the furnace directly supplies heat to the vessel wall and further superheats steam which is subsequently conveyed into the vessel.

It is a still further object of the present invention to provide the vessel with a pivoted door which is actuatable from a completely closed and sealed position to a completely open position substantially instantaneously.

It is a yet further object of the present invention to utilize the apparatus to explosively remove the skin or other covering from various food products with minimum loss of or damage to edible portions of said products.

It is a still further object of the present invention to insert such food products into the above described vessel, to surface heat them at ultra rapid rate by simultaneous exposure to radiant heat from the vessel walls and contact heat from pressurized superheated steam, and to substantially instantaneously relieve the pressure to thereby cause the food product skins or other covering to be exploded off of the remainder of the food product portions.

Still another object of the present invention is to utilize the thermal blast process as described above to explosively remove outer coverings from certain food products while simultaneously removing other inedible portions such as the cores from pepper pods or the viscera from fish.

These and other objects, aspects and features of the present invention will be better understood from the following description of preferred embodiments thereof, given by way of example only, and taken in conjunction with the following drawings:

BRIEF DESCRIPTION OF THE DRAWINGS

FIG. 1 shows a side view of the apparatus according to the present invention, partially broken away to show detail.

FIG. 2 shows a front view of the apparatus with the cylinder head removed for detail.

FIG. 3 shows a rear view of the apparatus.

FIG. 6 shows a front view of the pressure vessel showing details of the cylinder head in the open position.

FIG. 7 shows a cross-sectional view through the steam inlet swivel joint to the pressure vessel.

FIG. 8 shows the relation of root size to peeled yield of "Red Jewel" sweet potatoes when peeled by thermal blast in comparison with lye and saturated steam methods.

FIG. 11 shows a view from below of the cylinder head assembly hinge details.

DETAILED DESCRIPTION OF THE PREFERRED EMBODIMENTS

Figure 4:
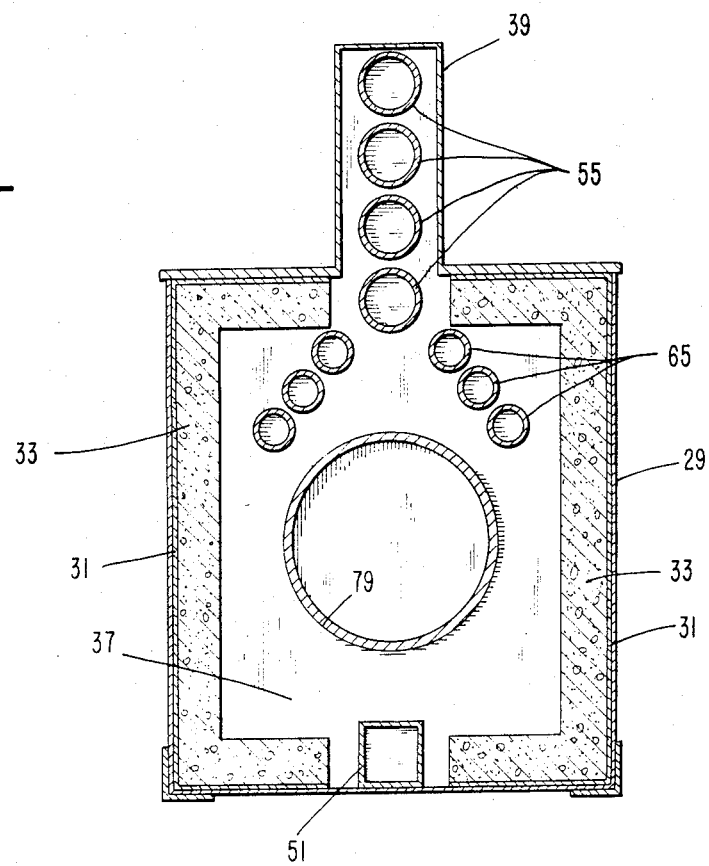
FIG. 4 shows a cross-sectional view along the line 4—4 of FIG. 1.

Referring to FIG. 1, the furnace frame 10 is mounted on a stand 17 by means of pivot bearings 19. This mounting permits the furnace assembly 27 to be tilted upward or downward with respect to the horizontal which facilitates the charging and discharging of the product into and from the cylinder. A tilt adjustor handle 23 is operative to control the frictional engagement of a screw (not shown) against tilt support 21 which provides means for changing the tilt angle and, for holding it in a fixed position. Hoist links 13 are also provided to allow easy transport through engagement with hoist hooks (not shown).

The furnace body is approximately cubical in shape, having outer dimensions preferably of about 13⅜" width by 22¼" length by 14" height. These dimensions are exclusive of the frame 10 and are merely exemplary. The housing 29 is preferably constructed from 16 gauge steel plating. Beneath this steel plating is a heat reflecting layer 31 (preferably aluminum foil) and, finally, a 2½"-3" insulation layer 33 consisting preferably of fire brick. These bricks are held in place by anchor screws 35. The combustion chamber 37 consists of the space enclosed by the fire brick. Located inside this chamber are a pilot burner 49, a main burner 51, cylindrical vessel 79 and steam superheater coil 65. Located in the furnace vent 39 at the top of the combustion chamber is a coil 55 for preheating the air supply to the main burner. This vent 39 consists of an opening preferably 2 2/5" wide by 16" long between the fire brick at the top of the furnace and extending about 6" above the top of the furnace. Air passing through this coil absorbs heat transmitted to the coil by the products of combustion leaving the combustion chamber. It is stressed that the above disclosed dimensions and materials are not to be considered limiting and are presented merely to show one example of suitable dimensions. Any dimensions and suitable materials may be used within the purview of this invention, the dimensions and materials being determined by the specific intended uses of the apparatus and specific methods to be practiced therewith.

The main burner 51 is located at the bottom of the combustion chamber, and extends the full length of this chamber. The fuel line 41 supplies fuel to burner 51 and is equipped with a manual valve 47 and a solenoid control valve 45 which is actuated by a pilostat control unit 43. The pilostat is a small magnetic switch having a coil (not shown) that is energized from a thermocouple (not shown) in contact with the flame of the pilot burner 49 to the furnace. The electrical current to the solenoid valve 45 that feeds gas to the main furnace burner 51 is wired through the pilostat switch 43 so that no gas can reach the main burner unless the pilot burner is on and the pilostat switch set in the closed position. This is merely a safety feature and is standard equipment on essentially all furnaces, water heaters, etc. Air is forced to the main burner 51 by means of a fan 53 which takes in fresh air and forces it first through the air preheater coil 55 and then to the burner 51. Air flow rate is regulated by the manual valve 57 and air temperature is measured by means of the in-line thermometer 59. As a safety factor, the electric current to the solenoid gas supply valve 45 is preferably wired through the air fan switch (not shown) so that no gas can flow to the main burner unless the fan is running.

The cylindrical vessel 79 (processing chamber) is mounted horizontally immediately above the main burner 51 where during rotation it is in constant contact with the burner flame. The cylinder is, in the preferred embodiment 6" (inside diameter) by 24" long and has 5/16" wall thickness. The outer surface of the cylinder is circumferentially grooved in order to form fins 81 and thus increase the surface area exposed to the furnace flame. These grooves are preferably $\frac{1}{8}$" deep and are preferably spaced at about 1/5" intervals along virtually the entire length of the cylinder except for the 2$\frac{1}{2}$" portion thereof at the front end which extends outside the furnace 27. The back end of the cylinder is preferably closed with $\frac{1}{2}$" plating and a 1$\frac{1}{2}$" diameter center opening is formed therein. A shaft 85 is preferably welded into this opening. This shaft has an outside diameter of about 1$\frac{1}{2}$" and extends through the back end bearing 87 which provides the back end support. The shaft is also drilled longitudinally and equipped with a sealed swivel joint (FIG. 7) described hereinafter which provides for admission of steam to the cylinder while it is in rotation. Rotation of the cylinder is provided by means of a motor 93, a gear reduction box 97 connected thereto, a chain drive 91, and a drive sprocket 89. This sprocket is preferably keyed to the shaft 85 between the back end of the cylindrical vessel 79 and the retainer nut 68 described below. This is shown in FIG. 7.

Referring now to FIG. 7, the steam swivel joint 77 will be described in detail. As shown in FIG. 7, the vessel 79 includes a substantially flat rear wall 80 through which is centrally bored a port 82. The shaft 85 is welded into the wall port 82 to form an integral assembly. Shaft 85 has formed therein bores 88 and 90 connected by shoulder 92, the bore 90 being aligned, in assembly, with port 82. As shown, the bore 88 and shoulder 92 form a chamber within the shaft 85, in which are slidably inserted, first, a ring 52 preferably made of a metal such as bronze, having an inside diameter corresponding to that of the bore 90; second, steam inlet pipe 71 having a bore 58 therethrough with a diameter corresponding to that of the bore 79a and further including a flange 60 with an outer diameter corresponding to that of the bore 88, the flange 60 having an end 62 bearing against ring 52; third, a plurality of packings 64 inserted between the steam inlet pipe 71 and bore 88 one of which bears against the flange 60 of steam inlet pipe 71. A spacer 66 bears against the outermost packing member 64 and is retained in bore 88 by threaded retainer nut 68 which has inner threads 70 corresponding to threads 72 on the outer surface of shaft 85. The steam inlet pipe 71 further includes a threaded portion 74 allowing rigid attachment to a fixed steam supply conduit.

As further shown in FIG. 7, the shaft 85 has an outer periphery of stepped configuration with a large diameter portion 76 connected to a small diameter portion 78 by an annular shoulder 80. The bearing 87 bears against the shoulder 80 and rotatably supports the shaft 85 while being supported by the furnace frame 10.

As should be self-evident, with the steam inlet pipe 71 rigidly connected to a steam supply pipe, the shaft 85 will rotate with respect to said steam inlet pipe while steam is being supplied to the interior of vessel 79 through bore 58, ring 52, bore 90 and port 82.

The front end of the cylinder opens to its full diameter. It is supported and held in position by four rollers 83 (FIG. 2) which are in tangental contact with outer perimeter of this cylinder at about 90 degrees spacing apart. Closing of the front end is provided for by means of a hinged gasket-sealed head assembly 99. The hinge is equipped with tension springs 111 and meshing gear linkage 109. These serve to accelerate the opening speed of the head 101 to aid the explosive process, and then to absorb shock by decelerating the head swing speed as it approaches the wide open position. A special shock absorbing catch 125 further decelerates the head swing and prevents it from rebounding into the pathway of the discharging product. A special trip latch 115 and closing nut 117 provide for the sealing of the cylinder after it is charged with the product and for triggering the explosion at the end of the process period.

Figure 5:
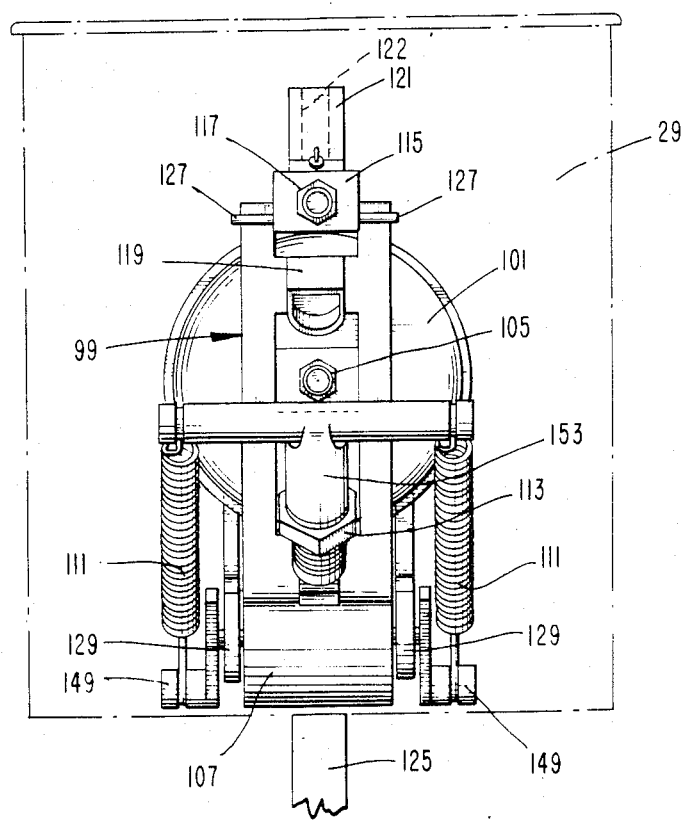
FIG. 5 shows a front view of the pressure vessel showing details of the cylinder head in the closed position.

With reference now to FIGS. 1, 5 and 6 in particular, the cylinder head assembly 99 will be described in greater detail.

The cylinder head assembly 99 might be considered as a composite of three units; namely the cylinder head per se 101, the cylinder head hinge 107, and the cylinder head trip latch 115. The head 101 is pivotably secured to the hinge by means of the cylinder head adjustment bolt 105. This provides for uniform pressure on all areas of the cylinder head gasket 103 when the vessel is closed and sealed for operating under pressure. However, it should be noted that bolt 105 is not used to tighten the head against the gasket during a processing operation, but rather the cylinder head closing nut 117 is used for this purpose.

The cylinder head hinge 107 includes the tension springs 111 which produce a torque force on the opening swing of the hinge. However, the linkage of the spring through meshing gears of different diameters, and of off-set arms, make it possible to adjust the linkage so that there is very little torque force on the hinge when the door is fully closed as shown in the drawing. This makes it easier to tighten the door against the gasket by means of the closing nut 117. At the end of a heat/pressure treatment of the product inside the vessel, the explosive discharge of the product is accomplished by placing a lever (not shown) in the cylinder head latch lever member 121 top opening 122 and pulling toward the cylinder 79. This causes the latch to swing upward against the force of the spring 123 thus unlatching the door by moving the latching pins 127 from the top of the hinge. As the door begins to open, the torque force from the tension springs 111 increases rapidly. This force together with the force of expanding steam or air from the cylinder greatly accelerates the opening speed of the door. The next problem is to stop the door when fully open. The tension springs come into play again in this operation. As the door approaches the open situation the torque force decreases down to zero, then rapidly builds up in the opposite direction. This decelerates the door swing speed in the wide open position and thus reduces the force against the shock absorbing catch latch 125.

Now, with reference, in particular, to FIGS. 9-11, the specific details of the operation of tension springs 111 and gear linkage 109 will now be described. As shown, the cylinder head 101 is pivoted on a hinge 107 which forms an integral part, at its extreme end, of a first gear 141. The gear 141 rotates on shaft 143 which also forms the pivot point for cylinder head 101. The gear 141 meshes with a second gear 145 which rotates on shaft 147. As shown in FIGS. 10 and 11, offset arms 149 are fixedly mounted on shaft 147 and thus rotate along with second gear 145. Tension springs 111 are mounted on respective arms 149 at one end thereof and are mounted to the cylinder head assembly 99 at their other end on supports 153 which extend outwardly from spring adjustment nut 113. Thus it is seen that the offset arms, when rotated, vary the length of springs 111 to thereby accordingly vary the force exerted onto the cylinder head assembly 99 by the springs 111. In the preferred embodiment, the first gear 141 to second gear 145 ratio is approximately 3 to 2 which causes the second gear 145 to rotate at a faster rate of speed than the first gear 141 and oppositely in direction.

Figure 9:
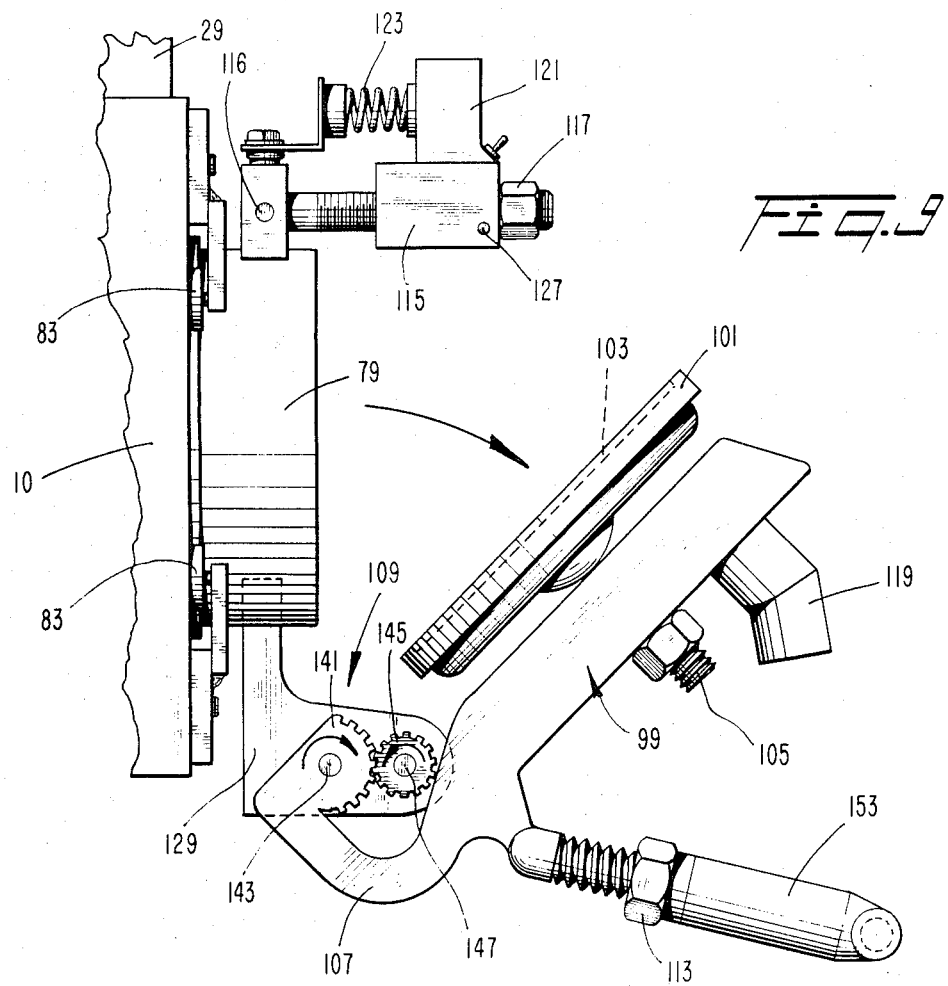
FIG. 9 shows a side view of the cylinder head assembly and hinge with parts removed to show gear details.
Figure 10:
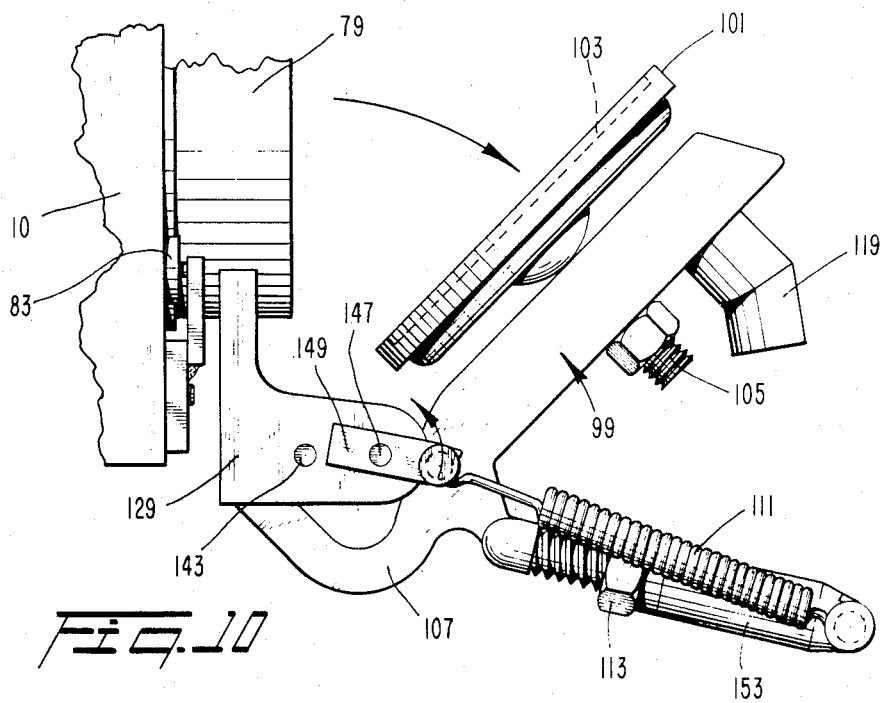
FIG. 10 shows a view similar to that of FIG. 9 with parts replaced.

The gear ratio (FIG. 9), the angle of attachment of the offset arms 149 with respect to the position of cylinder head 99 (FIG. 10) and the angle of attachment of tension springs 111 to the hinge supports 153 are specifically selected as shown in FIGS. 9-11 to provide torque forces from springs 111 which:

(1) firstly accelerate the opening speed of the cylinder head assembly 99 until it reaches the neutral position shown in FIG. 10; and (2) secondly decelerate the speed of the swing of cylinder head assembly 99 to prevent shock thereof when it is stopped and caught in the wide open position by the catch 125.

(3) As designed, when the cylinder head 101 is closed and locked by latching pins 127, the torque from the springs 111 is quite low, rapidly increasing as the cylinder head is moved slightly away from latching pins 127.

To close the door after charging the cylinder with a product, the nut 117 is first loosened approximately two turns. The lever (not shown) is then placed in the cylinder head lever slot 119 and the door swings toward the closed position. When the sloped top end of the hinge 107 engages the latching pins 127 it raises the trip latch 115 and when the door is fully closed the force of the spring 123 pushes the trip latch 115 back down causing the latching pins 127 to move into position behind the hinge. Nut 117 is then tightened. It is noted that the trip latch assembly 115 pivots about pin 116.

A special tool may be provided for opening and closing the head. It has a socket on one end that fits the nut 117 and the opposite end fits into the slots 121 and 119. An off-set arm is also attached to the side to provide a crank. By using the socket end and the off-set crank, the nut 117 is tightened or loosened. By reversing ends of the tool it is used as a lever for closing the door and for operating the trip latch to trigger the explosive discharge.

Saturated steam is supplied to the apparatus at a suitable pressure for the product being processed. Approximately 95 psig has proven to be satisfactory for many products. This steam is first passed through a dewatering cylinder (separate from the steam blast apparatus) and then through a flexible line 61 to the intake valve 63 located at the back end of the furnace. This valve supplies saturated steam to the superheater coil 65 located in the top section of the combustion chamber 37. The flexible steam supply line is used in order to permit tilting of the furnace as already described. The superheater coil sections are arranged in a counter flow fashion in the combustion chamber to facilitate heat absorption from the products of combustion. After the steam passes through the six sections of the superheater coil, it is piped from the furnace to the vessel 79 by means of the swivel inlet 77 where it is further superheated by contact with and radiation from the hot cylinder walls. The manual valve 69 regulates the flow of steam to the cylinder. The pressure gauge 67 measures the pressure of the superheated steam entering the cylinder and the in-line thermometer 73 measures its temperature.

It is to be understood that this invention is not limited to the foregoing detailed description of the apparatus. While the present design has proven to be effective and efficient, there are many modifications that can easily be made which would not depart from the basic unique features of the invention. Some of these possible modifications are as follows:

1. Dimensions of the apparatus might be scaled upward to provide for production capacities required in commercial operations. Ratios of dimensions, as for example, the diameter-to-length ratio of the processing cylinder, may also be varied within reasonable limits.

2. The furnace design may be modified for the use of sources of heat other than natural gas. As for example, butane gas, alcohol, fuel oil, electricity, etc.

3. The heat absorbing components may be arranged in the combustion chamber in a different order from that specified in the present design.

4. The pressure of saturated steam supplied to the superheater coils may vary considerably depending on the product and other factors.

5. Steam may be superheated in a suitable steam superheater that is separate from the processing uit. If this were done, the furnace would still be used as specified in the present design for transmitting heat to the outer surface of the cylinder in order to provide radiant heat, or some other method may be used for supplying the radiant heat. Another alternative would be to superheat the steam to a higher temperature and eliminate the heat application to the surface of the cylinder. Still another alternative is to use saturated steam at a higher pressure than that required when superheated steam and radiant heat are used. While this is a possibility, it is not a good approach because of the increase required in the operating steam pressure.

6. At the end of the heat period, regardless of the steam treatment used, the cylinder may be first exhausted to a selected lower pressure and then blasted. A further alternative is to exhaust the cylinder essentially to atmospheric pressure and inject cold water into it prior to the discharge of the product. The product being processed and other factors dictate the alternative treatment to use.

7. In the case of certain products with very thin coverings, for example peaches, the product can be heated in superheated steam at atmospheric pressure with supplemental radiant heat. In this case a continuous counter-flow heating system is used, and a scrub-wash treatment replaces the blast process. While this method is superior to conventional methods, it is a second choice to the heat-blast process.

8. The cylinder head assembly may be modified in several ways. For example, a metal-to-metal seal may be used instead of the gasket seal of the present design. Also, a hydraulic system for closing and opening the head may be substituted for the present mechanical system which employes tension springs for rapid opening and for cushioning the stop of the head in the wide open position.

9. The several operations involved in charging the cylinder with the product, timing the process period, and discharging the product may be partially or fully automated in order to reduce the required manual operations.

DETAILS OF THERMAL BLAST PROCESS

Specific treatments of the thermal blast process may vary with several factors such as the particular product to be processed, its maturity, pre-process storage, pre-peel treatments, and the specific objectives sought. Therefore, this section will be concerned with an outline of the steps involved in the process and with parameters for processing conditions. Details for processing specific products will be given in connection with the processing examples presented in another section of this disclosure.

The processing steps are:

1. Pre-process treatments—Depending on the product, this may require washing and sorting to remove culls. A treatment to increase the moisture in the area beneath the covering has proven to be beneficial in a few cases. This may be accomplished by holding the product submerged in water for a suitable time, or by a water-submerged vacuum treatment. When blast peeling apples, pre-coring has proven to be advantageous. Precut treatments of the stem end of pepper pods have proven to be beneficial in removing the core of this product during blast peeling. Preheat treatments of products prior to blast processing have been tested, and have proven to be advantageous with some products.

2. Proper preheating of the apparatus is essential in providing for supplemental radiant heat from the cylinder walls and in timing of the heat treatment for optimum results for some commodities. Preheating is not necessary when the apparatus is in continuous use.

3. Steam pressure—Depending on the crop and other factors, the steam pressure may vary over a considerable range. Approximately 95 psig has proven to be very satisfactory for many products. Conventionally exhausting the cylinder to a lower pressure prior to blasting has proven to be advantageous in some cases.

4. Heat treatment—A particular product may be processed satisfactorily over a considerable temperature range provided the time is properly adjusted. At optimum levels, the time decreases as the temperature increases. Extreme temperatures that may be used on different products range from approximately 230° F. to 1000° F. The time periods may range from 3 seconds to 5 minutes. However, a temperature of approximately 550° F., and a time period of 5 seconds have proven to be satisfactory for many products.

The use of very hot pressurized air, heated in the steam superheater coils of the thermal blast apparatus, has proven effective in shelling some varieties of nuts.

5. Charging and discharging—The following operations are executed in rapid succession: tilt apparatus upward, slightly open steam supply valve, add charge of product to cylinder, close cylinder head, tighten closing nut, open steam supply valve, start cylinder rotating, tilt apparatus to horizontal position, operate until time period has expired, tilt apparatus downward, stop rotation of cylinder, trip the cylinder head latch to trigger the explosive discharge of the product, close steam supply valve. These operations may be fully automated.

6. Catching the product—The product may be caught by discharging it from the cylinder into a reservoir of water, against a padded surface, into an elevated receptacle, or by another means. Properties of the product and other factors determine which method should be used. 7. Post-process treatment—As with other methods, washing is usually required following the steam blast process. Some hand trimming is also required although usually not as much as is required by other methods.

THERMAL BLAST TEST OPERATIONS

The thermal blast method and apparatus that have been described above were used extensively in laboratory tests on many food products. Results of these tests are presented in Tables 1 through 9. As indicated by the data, the process has proven to be very effective not only in the peeling of many fruits and vegetables but also in removing unedible coverings from other food products. In some cases unedible portions other than coverings are also effectively removed, as for example the core of pimiento and bell peppers.

Examples of tests have been made on different foods and the results obtained are presented in Table 1. The food products are grouped according to the cover removal process involved which include peeling of fruits and vegetables, skinning of onions, sucking and silking green corn, shelling legume crops, shelling nut crops, shelling seafoods, scaling and skinning of fish, skinning and eviscerating squid, and skinning beef or pork tongues. The table includes columns on process temperature and time, and numerical ratings on effectiveness of the process. Product yields are presented for most of the products that are subject to substantial loss of edible portions during the cover removal process.

The examples present in Table 2 clearly demonstrate the drastic reduction in peel time and peeling loss from thermal blast peeling as compared with lye, saturated steam or flame peeling. In the tests on eggplant, peeling times were 120 seconds for lye, 30 for saturated steam, 60 for flame, but only 10 seconds for thermal blast peeling. Respective percentage peeling losses were 21, 17, 20, and 3. Peeling times for peach were 60 seconds for lye and 4 for thermal blast. Peeling losses were 14 and 2.5 percent respectively.

Presented in table 3 are data on peeled yield, heat penetration, and total solids of 'Red Jewel' sweet potato roots of different sizes when peeled by the thermal blast method in comparison with lye or saturated steam. Total solids of the roots were not significantly affected by peeling method. They were slightly lower for the 2.5 to 3.5 cm roots than for larger root sizes regardless of the peeling method used. Heat penetration depth was affected drastically by peeling method. It was less than 1 mm for thermal blast peeling as compared with 2.8 to 3 mm for saturated steam and 4.7 to 4.9 mm for lye.

As would be expected, the peeled yield increased with increases in root size regardless of the method used. However, there was a difference in the pattern of the increase when the roots where thermal blast peeled as compared with lye or saturated steam peeling. This is presented graphically in FIG. 8. The peeled yield curves for both saturated steam and lye slant upward with root size in almost straight lines. By comparison the curve for thermal blast peeling starts at a relatively high peeled yield level for the smallest roots, rises sharply to the next larger size and then tends to level off. Thermal blast peeled roots of the smallest size class yielded a higher weight percentage of peeled, trimmed and washed roots than that of the largest size class roots when peeled by lye or saturated steam.

These data clearly illustrate the advantages of the thermal blast process in controlling heat penetration depth and subsequently the loss of edible portions of the product. Due to the additional advantage in processing smaller sizes, the thermal blast process might well provide a method for processing size grades that are too small for feasible processing by conventional methods.

Peeled yield of different grades of "Tropic" tomatoes processed by thermal blast in comparison with other peeling methods are presented in Table 4. Methods used included the freeze-heat process which utilizes liquid nitrogen for ultra-rapid freezing of product surface followed by shock treatment in hot water. Although this method is little used because of excessive cost, it is noted for exceptionally high peeled yields and for high quality of the peeled product. High peeled yields from this method in comparison with conventional methods is demonstrated by the replicated data presented in the table; however, the data also shows even higher peeled yields resulting from the thermal blast method. The tomatoes peeled by either the freeze-heat or the thermal blast methods were uniquely superior in wholeness and surface smoothness, when compared with tomatoes peeled by the conventional lye, hot water, or steam methods. However, the surface of tomatoes peeled by the thermal blast was less veiny and more attractive than that of the freeze-heat peeled tomatoes. Both the hot water and the freeze-heat methods required substantially more hand work following the peel treatment than was required by the thermal blast, lye, or steam methods. The data clearly demonstrates the superior features of the thermal blast method for peeling tomatoes as compared with other methods.

The replicated data presented in Table 5 demonstrate a phenomenal increase in peeled yield of the "Loring" variety of peach when peeled by the thermal blast treatment in comparison with the conventional lye method. The thermal blast method also resulted in a smoother peeled surface and less breakage of the flesh. The effects of the strong chemical (lye) was also eliminated.

Replicated data concerning peeled yields of four varieities of plums processed by the thermal blast method, and the effects of this method of peeling on qualities of canned plums are presented in Table 6. Peeled yield percentages were exceptionally high in all cases, ranging from 92.4 for "AU-1" to 95.5 for "Homeside." With one exception, the canned products from all varieties rated higher in appearance, texture, and flavor when the fruit was peeled by the thermal blast process before canning, as compared with unpeeled, canned products. The exception was the texture of the canned "Santa Rosa" variety which scored higher in the unpeeled product. This is a soft variety which did not retain its firmness in the canned product when peeled prior to canning.

These data demonstrate that the thermal blast method of peeling can be used to improve the flavor of canned plums by removal of the bitter peel, without excessive peeling losses and with improvement in appearance of the pack. These results cannot be achieved by the relatively long heat periods and/or strong chemical treatments of conventional peeling methods.

Pimiento and bell peppers present a special peeling problem. The skins of these fruits are tightly attached to the flesh and, therefore, do not separate readily by moderate scalding or steaming. In commercial canning operations, separation is achieved by using relatively drastic treatments such as flaming, hot lye, or high pressure saturated steam; however, these treatments tend to remove a substantial portion of edible pod tissue beneath the skin during the peel treatments. Due to the relatively large core cavity of the fruit, only the pod walls being edible, a small loss from the surface results in a relative high percentage loss of edible product.

The thermal blast process offers an effective method for removing the peel of pimientoes as well as bell peppers with minimal loss of edible pod tissue, resulting in exceptionally high peeled yield. The core of the fruit can also be removed during the blast peel process by use of a suitable pod treatment prior to peeling, thus eliminating the costly post-peel coring treatment of conventional pepper cnaning operations.

Much research has been conducted to determine specific pre-peel and blast treatments that will effectively remove both the peel and the core during the thermal blast process, without breaking the pod. A total of 186 laboratory tests were made and the results recorded. Variable treatments included pre-peel treatments of pods, variation in steam exposure, different cylinder wall temperatures, and modifications of the blast operation. Specific treatments and results obtained are presented in Table 7.

One or more of the following storage and pre-peeling treatments have been successfully employed for peppers:

(1) storage of the peppers at approximately 80° F. (within a range of 70° to 110° F.) for a sufficient period for enzymatic ripening and abscission of the carpel cells thereof;

(2) storage of the peppers in a controlled atmosphere using enzymes and/or hormones to hasten ripening and abscission around carpel;

(3) holding the peppers for approximately 20 seconds in boiling water prior to thermal blast process;

(4) dipping the peppers in a boiling lye solution prior to thermal blast process;

(5) exposing stem ends of the pepper pods to a boiling lye solution prior to thermal blast process;

(6) making a circular cut in or near the carpel tissue at the stem end of the pods, the cut penetrating $\frac{1}{8}$" to $1\frac{3}{4}$" longitudinally into the pods, the cut being made prior to thermal blast process;

(7) cutting a thin cross section slice from the stem end of the pods prior to the thermal blast process, the cut slicing through carpel tissues;

(8) making one or more longitudinal cuts, ½" to 1¾" long, through sides of the pod walls prior to thermal blast process.

These data demonstrate alternative treatments that may be used successfully for peeling without coring as well as for peeling and coring. For example, in test numbers 108 to 111, an 18 to 20 second exposure of untreated pods, to 95 psig steam, superheated to 500° or 600° F., followed by blast treatment at a reduced pressure, resulted in excellent peeling and pod wholeness, but did not remove cores from pods. After coring the pods, the product yield ranged from 70.1 to 73.3 percent which is greatly in excess of the yields generally obtained by conventional methods of peeling. The pods retained their physical integrity quite well during the peel treatment. This left them in better condition for machine coring than is usually the case with saturated stream or lye pelled pods which become limp, and often are broken during peeling.

Thermal blast peeling followed by machine coring as described above would be a great improvement over processes now in commercial use; however, an even better procedure would be to use one of the alternative treatments demonstrated in Table 7 which results in core removal as well as peeling during the thermal blast process. Several variations for effectively accomplishing this are demonstrated in the table. They include certain cuts at the stem end of the pod to allow steam to enter the pod cavity and to blow the core out without pod breakage during the blast. Lye treatment at the stem end of the pod is also used for the same purpose. Holding the pods for 30 seconds in boiling water immediately before peeling is still another treatment that aids in the removal of cores during the blast process, test numbers 179 to 181.

An approach to the thermal blast coring problems that does not require cutting or lye treatment of the pod is to use a pre-peel treatment to induce enzymatic abscission of cells connecting the core to the stem end of the pod. This was accomplished by a five-week storage period of the peppers at 40° F. in atmospheric air, test numbers 184, 185. Use of a suitable storage gas to replace the air should drastically reduce the storage period required to accomplish the results.

Data are presented in Table 8 on effects of peeling method on qualities of fresh and canned pimientoes. Thermal blast peeling, compared with lye peeling, resulted in brighter color of freshly peeled pods and in brighter color and firmer texture of canned products.

The thermal blast process has proven to be very effective in removing shells from nuts (Table 1). Tests were made to determine specific pre-shelling and blast treatments for effectively shelling pecans without breaking or skinning the kernals (Table 9). This study included treatments involving cold air blast shelling, thermal blast shelling with hot air, and thermal blast shelling using superheated steam. Pre-shelling treatments included pre-cracking of the pecan shell, and pre-soak treatments in water at different temperatures and pressures. Shelling results from specific treatments are presented in the table. Two varieties of pecans are used in the study.

While the cold air blast process resulted in very poor shelling, excellent results were obtained with the thermal blast method, both with hot air and with superheated steam. Negative results were obtained by cracking the shells lightly before blast shelling. Soaking the pecans for 5 minutes in water was very effective as a pre-shelling treatment for thermal blast shelling. Excellent results were obtained by soaking at 70° F. under 25" of vacuum, at 150° F. under atmospheric pressure, and at 70° F. under 70 psig pressure. The following pretreatments also were found helpful:

(1) soaking the pecans for approximately 30 minutes in water under atmospheric pressure, preferably at approximately 150° F., optionally within a range of 32° to 180° F.;

(2) soaking the pecans for approximately 5 minutes in water under a vacuum, preferably at approximately 70° F., optionally within a range of 32° to 140° F., and relieving the vacuum while pecans are still submerged;

(3) soaking the pecans in water for approximately 5 minutes under elevated pressure; temperature of said water being preferably at approximately 70° F.; optional temperature range being 32° to 200° F.; preferable pressure of water being approximately 70 psig and optional range being 5 to 125 psig.

The five-minute soak period increases the moisture beneath the shell to the level required for effectively blasting the shell away after a short heat period in the pressurized chamber. Too much moisture beneath the shell necessitates a longer heat period for effective blasting; and this, in turn, causes overheating and subsequent skinning and breaking of the kernel. An insufficient amount of moisture beneath the shell results in ineffective blasting of the shell regardless of the amount of heating.

TABLE 1

Examples of cover removal tests on different food products by the thermal blast process.*

| Cover removal process | Product[1] | Steam (approx. 95 psig): Temperature °F. | Time Sec. | Product yield[2] | Rating[3] |
|---|---|---|---|---|---|
| Peeling of fruit and vegetable crops | Apple | 500 | 7 | 98.0 | 5 |
| | Peach | 500 | 4 | 98.5 | 5 |
| | Plum | 500 | 5 | 95.5 | 5 |
| | Pear | 500 | 10 | 96.7 | 5 |
| | Avacado | 600 | 5 | 81.5 | 5 |
| | Mango | 600 | 50 | 88.0 | 5 |
| | Orange | 700 | 150 | — | 5 |
| | Grapefruit | 300 | 10 | — | 4 |
| | Tomato | 500 | 4 | 95.0 | 5 |
| | Sweet potato | 650 | 20 | 95.4 | 5 |
| | Irish potato | 700 | 20 | 96.0 | 5 |
| | Carrot | 500 | 7 | 95.0 | 5 |
| | Beet | 500 | 20 | 96.5 | 5 |
| | Rutabaga | 600 | 20 | 98.1 | 4.5 |
| | Eggplant | 525 | 10 | 98.0 | 4 |
| | Cucumber | 500 | 10 | 96.5 | 5 |
| | Pimiento pepper[4] | 500 | 20 | 72.5 | 4.8 |
| | Bell Pepper[4] | 500 | 16 | 73.2 | 5 |
| | Alagold pumpkin | 650 | 45 | 89.4 | 5 |
| Skinning | Onion | 500 | 5 | 95.3 | 5 |
| Shucking and silking | Corn | 500 | 5 | — | 5 |
| Shelling legume crops | Southern peas | 300 | 5 | — | 4.5 |
| | Lima beans | 300 | 10 | — | 3 |
| | English peas | 500 | 5 | — | 3 |
| | Peanuts | 500 | 10 | — | 3 |
| Shelling nut crops | Pecan | 650 | 15 | — | 4.5 |
| | Brazil nut | 500 | 60 | — | 4 |
| | Almond | 550 | 45 | — | 4.5 |
| | Chestnut | 550 | 30 | 79.0 | 5 |
| | Coconut | 700 | 120 | — | 4 |
| | Filbert | 550 | 60 | — | 2 |
| Shelling | Shrimp | 500 | 5 | 55 | 4.5 |

TABLE 1-continued

Examples of cover removal tests on different food products by the thermal blast process.*

| Cover removal process | Product[1] | Steam (approx. 95 psig): Temperature °F. | Time Sec. | Product yield[2] | Rating[3] |
|---|---|---|---|---|---|
| seafoods | Rock shrimp | 400 | 15 | — | 4 |
|  | Crayfish, boiled | 450 | 20 | — | 5 |
| Skinning and scaling fish | Squid | 450 | 5 | — | 4.5 |
|  | Catfish | 350 | 8 | — | 5 |
|  | Scaley fish | 500 | 10 | — | 5 |
| Skinning | Beef tongues | 500 | 10 | — | 3 |

[1]Raw products used in the tests were average to above average in size, sound, and free from major defects.
[2]Percent yield by weight after steam blast processing, trimming; and washing.
[3]Effectiveness in removing covering without loss of or damage to edible portion:
1 means poor - unacceptable.
2 means fair - still unacceptable.
3 means good - conditionally acceptable.
4 means very good - comparable with best conventional methods.
5 means excellent - superior to conventional methods.
[4]Thermal blast treatment removes core as well as peel.
*Your attention is directed to attached Exhibit I which includes pictorial illustrations of thermally blasted Apples, Peaches, Avocadoes, Oranges, Tomatoes, Sweet Potato, Irish Potato, Cucumber, Pimiento Peppers, Bell Peppers, Corn, Southern Peas, Lima Beans, Pecans, Blanched Almonds, Chestnuts, Coconuts and Rock Shrimp.

TABLE 2

Examples of peel time and peeling loss from steam blast process as compared with conventional methods.

| Peeling Method | Sweet Potato Peel time Sec. | Sweet Potato Peeling loss[2] Pct. | Eggplant Peel time Sec. | Eggplant Peeling loss[2] Pct. | Peach Peel time Sec. | Peach Peeling loss[2] Pct. |
|---|---|---|---|---|---|---|
| Lye bath, 205° F. | 300 | 20 | 120 | 21 | 60 | 14 |
| Saturated steam, 90 psig | 75 | 18 | 30 | 17 | — | — |
| Flame | — | — | 600 | 20[3] | — | — |
| Superheated thermal blast process | 20 (650° F.) | 3 | 10 (525° F.) | 3 | 4 (500° F.) | 2.5 |

[1]Raw products used in the tests were free from major defects and average to above average in size.
[2]Percent weight loss from peeling, trimming, and washing.
[3]Excessive amount of scrubbing and washing was necessary following flaming.

TABLE 3

Peeled yield, heat penetration, and total solids of 'Red Jewel' sweet potatoes of different sizes when peeled by thermal blast, lye, or saturated steam[1]

| Peeling method | Root size (diam) cm | Percent yield[2] | Heat penetration mm | Total solids percent |
|---|---|---|---|---|
| Lye, 10% sol., 205° F., 5 min. | 2.5-3.5 | 74.2 | 4.7 | 20.8 |
|  | 3.5-5.5 | 76.3 | 4.7 | 22.7 |
|  | 5.5-6.5 | 80.1 | 4.9 | 24.3 |
|  | >6.5 | 83.2 | 4.7 | 24.4 |
| Saturated steam, 90 psig, 75 sec. | 2.5-3.5 | 75.0 | 2.8 | 21.2 |
|  | 3.5-5.5 | 78.9 | 2.8 | 22.8 |
|  | 5.5-6.5 | 81.7 | 3.0 | 24.3 |
|  | >6.5 | 84.2 | 2.9 | 24.5 |
| Thermal blast, 650° F., 20 sec. | 2.5-3.5 | 85.9 | <1 | 21.9 |
|  | 3.5-5.5 | 95.4 | <1 | 23.8 |
|  | 5.5-6.5 | 97.5 | <1 | 24.3 |
|  | >6.5 | 97.5 | <1 | 23.1 |

[1]Sound roots, cured and stored for 4 months.
[2]Percent yield by weight of peeled, trimmed, and washed roots.

TABLE 4

Peeled yield of different grades of 'Tropic' tomatoes when processed by thermal blast in comparison with other peeling methods[1]

| Tomato quality grade | Conventional lye[2] % | Hot water[3] % | Conventional steam[4] % | Freeze-heat[5] % | Thermal blast[6] % |
|---|---|---|---|---|---|
| Good no cracks | 84.8 | 91.9 | 91.1 | 94.0 | 96.4 |
| <1 in. crack[7] | 82.3 | 90.0 | 88.9 | 92.3 | 94.8 |
| >1 in. crack[7] or slight green shoulder | 74.9 | 82.4 | 83.0 | 90.0 | 90.3 |

[1]10 replications of 10 fruits each.
[2]20% w/w solution of NaOH at 180° F.: 1 min. 20 sec. exposure for fruit with <1 in. crack, 1 min. 30 sec. exposure for fruit with >1 in. crack, or green shoulder.
[3]Boiling water (210.8° F.) for 30 sec.
[4]Saturated Steam at 90 psig for 8 seconds.
[5]10 sec. residence time in liquid nitrogen followed by 15 sec. in 182° F. water (time in nitrogen extended to 15 seconds for cracked tomatoes).
[6]Thermal blast, 90 psig, 400° F., 4 sec.
[7]Combined length of all cracks per fruit.

TABLE 5

Peeled yields[1] of 'Loring' peaches[2] by thermal blast and lye peeling.

| Peeling method | Peeled yield Whole fruit % | Peeled yield Peeled, pitted % |
|---|---|---|
| Thermal blast[3] | 98.1 | 95.8 |
| Lye peeled[4] | 85.2 | 80.1 |

[1]10 replications of 10 fruit each.
[2]'Loring' is a difficult variety to peel. The skin will not slip after exposure to boiling water or atmospheric steam.
[3]50 psig. 500° F., for 15 sec.
[4]2% w/w NaOH for 1 min. 15 sec at 210° F.

TABLE 6

Peeled yield of plum varieties processed by thermal blast and effects of peeling on qualities of canned product.

| Plum variety | Peeled yield[1] % | Appearance Peeled | Appearance Unpeeled | Texture Peeled | Texture Unpeeled | Flavor Peeled | Flavor Unpeeled |
|---|---|---|---|---|---|---|---|
| 'Ozark Premier' | 93.0 | 9.1 | 6.4 | 9.0 | 7.0 | 8.5 | 7.8 |
| 'Santa Rosa' | 94.3 | 8.9 | 6.8 | 6.6 | 7.9 | 8.8 | 6.6 |
| 'AU-1' | 92.4 | 8.5 | 5.4 | 7.1 | 4.9 | 8.9 | 7.6 |

TABLE 6-continued

Peeled yield of plum varieties processed by thermal blast and effects of peeling on qualities of canned product.

| Plum variety | Peeled yield[1] % | Organoleptic evaluation - canned product[2] | | | | | |
|---|---|---|---|---|---|---|---|
| | | Appearance | | Texture | | Flavor | |
| | | Peeled | Unpeeled | Peeled | Unpeeled | Peeled | Unpeeled |
| 'Homeside' | 95.5 | 8.6 | 5.5 | 8.9 | 7.3 | 8.7 | 6.3 |

[1]Plums peeled by thermal blast method using 30 psig, 500° F. steam for 15 sec.; 30 replications of 15 plums each.
[2]Multiple comparison ranking method using a 10 point scale where: 9 to 10 indicate unusually good quality; 7 to 8 good; 5 to 6 fair; 3 to 4 poor; 1 to 2 very poor.

TABLE 7

Examples of peeling and coring tests on pimento and bell peppers using variations of the thermal blast process (see footnotes).

| Lab Test Nos. | Pre-steam treatment[1] | Cylinder tempt.[2] °F. | Steam exposure 95 psig[3] °F./sec. | Discharge[4] | Product yield[5] % | Coring[6] | Peeling[6] | Pod wholeness[6] |
|---|---|---|---|---|---|---|---|---|
| I. Pimientos, canning stock, Equilibrated to 75–85° F.: | | | | | | | | |
| 45 | cc, 1½" | 600 | 350/15 | B-1 | 75.0 | Ex | Ex | Ex |
| 18 | " | " | 350/18 | " | 73.9 | V.G. | Ex | Ex |
| 19, 27 | " | " | 350/20 | " | 67.4 | Ex | Ex | G |
| 44 | cc, 1½"[7] | " | 350/15 | " | 69.3 | Ex | V.G. | G |
| 43 | cc, 1½"[7] | " | 350/18 | " | 69.9 | Ex | Ex | G |
| 69 | cc, ⅜" | 650 | 400/20 | " | 71.0 | Ex | Ex | F |
| 76 to 79 | cc. ⅜"[8] | 550 | 500/20 | " | 75.6 | Ex | Ex | Ex |
| 83 to 90 | cc, ⅜" | 550 | 500/20 | B-2 | 70.2 | Ex | Ex | Ex |
| 96, 98, 99 | " | " | 500/16 | " | 72.5 | Ex | Ex | Ex |
| 105 to 107 | " | 650 | 600/16 | " | 72.7 | Ex | V.G. | Ex |
| 108 | None | 850 | 600/20 | " | 73.3 | None | Ex | Ex |
| 109, 110 | " | 650 | " | " | 70.1 | None | Ex | Ex |
| 111 | " | 550 | 500/18 | " | 70.8 | None | Ex | Ex |
| 115, 120 | cc, ⅜" | " | 500/20 | E.C.W. | 72.7 | Ex | V.G. | Ex |
| 121, 122 | " | 600 | 550/20 | " | 72.1 | Ex | Ex | Ex |
| II. Pimientos, canning stock, Equilibrated to 40° F.: | | | | | | | | |
| 118, 123 | cc. ⅜" | 600 | 550/20 | E.C.W. | 72.4 | Ex | V.G. | Ex |
| 125, 126 | cc, 1½"[7] | " | " | " | 71.6 | Ex | F | Ex |
| 163 | Lye, 30/0[9] | 650 | 600/10 | B-2 | 72.1 | G | Ex | Ex |
| 164 | Lye, 20/10[9] | " | " | " | 70.0 | G | Ex | Ex |
| 165 | Lye, 10/10[9] | " | " | " | 72.2 | G | Ex | Ex |
| 179 to 181 | cc, ⅜"[10] | 600 | 550/20 | E.C.W. | 71.4 | Ex | Ex | Ex |
| III. Pimientos, canning stock, Held 5 weeks in 40° F. storage: | | | | | | | | |
| 182 | cc, ⅜"[11] | 600 | 550/20 | B-2 | 70.0 | Ex | Ex | V.G. |
| 183 | cc, ⅜"[12] | " | " | " | 70.3 | Ex | Ex | G |
| 184 | no cut[11] | " | " | " | 74.8 | V.G. | Ex | V.G. |
| 185 | no cut[12] | " | " | " | 74.9 | V.G. | Ex | Ex |
| IV. Bell pepper, canning stock, Equilibrated to 75–85° F.: | | | | | | | | |
| 186-B | cc, ⅜" | 550 | 500/16 | B-2 | 73.2 | Ex | Ex | Ex |

Pre-peel and Thermal Blast Treatments;
[1]cc means core cut at stem end of pod prior to peeling using a 1" diameter tubular knife; depth of cut as shown; core not removal from pod prior to peel unless otherwise indicated.
[2]Approximate temperature of internal surface of cylinder when charged with product.
[3]Temperature of steam and product exposure time (steam at approximately 95 psig).
[4]B-1 means cylinder was blasted at full pressure of steam exposure; B-2, exhausted to approximately one-half the steam exposure pressure than blasted; E.C.W., exhausted almost to atmospheric pressure followed by cold water injected.
[5]Percent yield by weight after peeling, coring, and washing.
[6]V.P., very poor; P, poor; F, fair; G, good; V.G., very good; Ex, excellent.
[7]Core removed from pod before peeling.
[8]1" longitudinal split on two sides of pod leaving pod intact at both ends.
[9]Pods not cut. 10% lye 216° F., pods dipped as indicated (seconds, stem end/seconds whole pod).
[10]Pods held 30 seconds in boiling water immediately before peeling.
[11]Pods from 40° F. storage equilibrated for 20 hours at approximately 80° F. before peeling.
[12]Pods directly from 40° F. storage

TABLE 8

Comparisons of qualities of thermal blast and lye peeled pimiento peppers.

| Peeling method and yield | Hunter Color Reading[3] freshly peeled: | | | Canned Product: | | | | |
| | L | a | b | Style | Texture[4] Kg | Color[3] L | a | b |
|---|---|---|---|---|---|---|---|---|
| Thermal Blast[1] | 34.7 | 38.4 | 21.1 | Whole Pod | 4.2 | 31.8 | 38.3 | 21.1 |
| | | | | Diced | 2.2 | 29.3 | 36.9 | 19.0 |
| Lye[2] | 28.2 | 37.6 | 19.5 | Whole Pod | 3.6 | 26.5 | 37.0 | 18.9 |

TABLE 8-continued

Comparisons of qualities of thermal blast and lye peeled pimiento peppers.

| Peeling method and yield | Hunter Color Reading[3] freshly peeled: | | | Canned Product: | | | | |
|---|---|---|---|---|---|---|---|---|
| | | | | | Texture[4] | Color[3] | | |
| | L | a | b | Style | Kg | L | a | b |
| | | | | Diced | 2.0 | 25.9 | 35.8 | 18.1 |

[1]Thermal Blast peeling, 90 psig, 550° F., 20 sec., with a 31.4% process loss.
[2]Lye peeling, 10% w/w solution of NaOH at 216° F. for 1.5 min., with a 34.4% processing loss.
[3]Hunter color values standardized to a red standard where L = 68.7, a = 23.0, and b = 9.4.
[4]Texture as measured using a 16 cm[2] section from the pod wall in a Kramer Shear Cell adapted to an Instron Model 1122 Universal Testing Machine.

TABLE 9

Blast shelling pecans using different pre-shell and blast treatments.

| Blast process | Treatment Variety and pre-shelling treatment | Blast Temperature/time | Shelling results |
|---|---|---|---|
| Cold Air Blast[1] | 'Desirable' without pre-shell treatment | 70° F./5 min. | Very Poor |
| Thermal blast using hot air[1] | 'Schley'[3] soaked 5 min. in water, 70° F. under 25" vacuum, vacuum released | 650° F./30 sec. | Poor |
| | 'Schley' soaked 5 min. in water 70° F. under 25" vacuum, vacuum released | 650° F./30 sec. | Excellent |
| | 'Desirable' soaked in water 30 min. 140° F., atmospheric pressure | 700° F./30 sec. | Shelled nuts but broke and skinned kernels. |
| | 'Desirable' soaked in water 30 min. 150° F., atmospheric pressure | 650° F./20 sec. | Excellent |
| | 'Desirable' soaked in water 5 min. 180° F., under pressure, 70 psig | 650° F./20 sec. | Fair shell but broke and skinned kernals. |
| | 'Desirable' soaked in water 5 min. 70° F., under pressure, 70 psig | 650° F./20 sec. | Excellent |
| | 'Schley' soaked in water 5 min. 70° F. under pressure, 70 psig | 700° F./20 sec. | Excellent |
| Thermal blast using superheated steam[2] | 'Schley', soaked in water 5 min. 70° F., under 70 psig pressure | 650° F./15 sec. | Excellent |
| | 'Schley', soaked in water 5 min. 70° F., | 650° F./10 sec. under 70 psig pressure | Fair, incomplete shell |

[1]Air at 90 psig.
[2]Steam at 90 psig
[3]Shells cracked lightly, but still intact.

The specification, drawings, tables, etc. that have been presented clearly describe and illustrate to one skilled in the art the effectiveness, wide application, and novelty of the methods and apparatus of this invention. To those skilled in the art to which this invention relates, many changes in design of apparatus and differing embodiments in the application thereof will suggest themselves without departing from the basic principals of the invention. The descriptions presented herein are intended to be purely illustrative and are intended to be limited solely by the appended claims.

What is claimed:

1. An apparatus for thermal blast removal of coverings from food products comprising:
   (a) furnace means including a combustion chamber having a burner therein;
   (b) a pressure vessel having exterior walls defining a vessel chamber mounted for controlled movement substantially within said furnace means, the exterior walls of said pressure vessel being heated by said furnace means:
   (c) said pressure vessel including a portion thereof extending outwardly from said furnace means and having a door means controlling an opening having an axis perpendicular thereto therein;
   (d) said furnace means and said pressure vessel being mounted on frame means;
   (e) means associated with said door means for controllably and substantially instantaneously opening said door means by moving said door means in a direction away from said vessel chamber and said axis; and
   (f) means supplying fluid heated by said furnace means to said vessel chamber, said heated fluid pressurizing and heating said vessel chamber and said food products located therein, and actuation of said means associated with said door means causing substantially instantaneous depressurization of said vessel chamber to atmospheric pressure.

2. The apparatus of claim 1, wherein said frame means pivotally supports said furnace means and pressure vessel so as to enable adjustable tilting thereof from the horizontal position.

3. The apparatus of claim 1, wherein said furnace means comprises a gas furnace.

4. The apparatus of claim 3, wherein said gas furnace includes gas supply to said burner and vent means and further includes an air fan and further includes an air preheater coil mounted in said vent means.

5. The apparatus of claim 1, wherein said combustion chamber surrounds said pressure vessel.

6. The apparatus of claim 5, wherein said pressure vessel comprises a substantially cylindrical container defining said vessel chamber and including a longitudinal axis, and further including means supporting said pressure vessel for rotation about the axis.

7. The apparatus of claim 6, wherein said pressure vessel further includes outer walls which are surface treated to increase the surface area and heat transfer capability thereof.

8. The apparatus of claim 5, wherein said combustion chamber has situated therein a steam superheater coil in an upper section thereof and inlet conduit means for supplying saturated steam or other gaseous medium to said superheater coil and outlet conduit means for conducting superheated steam or other gaseous medium from said superheater coil to said means supplying fluid to said interior chamber.

9. The apparatus of claim 8, wherein said means supplying fluid to said interior chamber comprises a swivel joint associated with said means supporting said pressure vessel for rotation.

10. The apparatus of claim 1, wherein receiving means is provided adjacent said frame means to catch food products which are blasted out of said door means.

11. The apparatus of claim 1, wherein said door means is pivotally mounted to said pressure vessel by a hinge assembly, said hinge assembly being mounted to said door means at a central region thereof; said hinge assembly including a pair of hinge members linked to a hinge support attached to said pressure vessel, said hinge members allowing at least 150° swing of said door means.

12. The apparatus of claim 11, wherein said hinge assembly further comprises:
 (a) said hinge members being linked to said hinge support by:
  (1) a first pair of bearings mounted on said hinge support;
  (2) a first shaft rotatably supported by said first pair of bearings;
  (3) a first gear fixed to said first shaft; and
  (4) said hinge members being rigidly attached to said first gear and rotatable therewith;
 (b) said first shaft thereby comprising the pivot axis of said hinge members;
 (c) said hinge support further including:
  (1) a second pair of bearings mounted thereon;
  (2) a second shaft rotatably supported on said second pair of bearings;
  (3) a second gear fixed to said second shaft; and
 (d) said first gear having first gear teeth and said second gear having second gear teeth said first and second gear teeth meshing whereby said gears rotate in opposite directions.

13. The apparatus of claim 12, wherein said second gear has a smaller diameter than the diameter of said first gear whereby said second gear rotates faster than said first gear.

14. The apparatus of claim 13, wherein said first gear diameter is about 1.5 times larger than the diameter of said second gear.

15. The apparatus of claim 13, wherein said second shaft has attached at opposite ends thereof a pair of off-set arms which rotate with said second shaft, each said off-set arm having attached at an end thereof remote from said second shaft a spring member, each spring member having another end attached to a respective hinge member at a location thereon remote from said hinge support.

16. The apparatus of claim 15, wherein said off-set arms are angularly related to said door means at all rotative positions thereof, and the ratio of diameters of said gears, said angular relation, and the angle with which said spring members are attached to said respective hinge members are selected to create spring member torque forces which:
 (a) first, upon initially releasing a trip latch mechanism holding said door means closed, accelerate the opening of the door means to a substantially instantaneous opening thereof; and
 (b) second, decelerate the opening of the door means to reduce shock thereon when said door means is stopped at its most open position.

17. The apparatus of claim 16, wherein said spring member torque forces are substantially zero when the door means is completely closed.

18. The apparatus of claim 17, wherein said hinge members each have a sloped free end, said ends being engaged by said trip latch mechanisms, and further tightening means is provided to seal said door means against said pressure vessel opening.

19. The apparatus of claim 17, wherein said trip latch mechanism further comprises:
 (a) a shaft rotatably mounted on said pressure vessel above said opening;
 (b) a latch mounted for pivotal motion with said shaft;
 (c) spring means associated with said latch and shaft which biases said latch to a position overlying a portion of said door means;
 (d) said latch including a recess therein for receiving a lever to enable pivoting of said latch to a position allowing substantially instantaneous opening of said door means.

20. The apparatus of claim 1, wherein said furnace means is equipped for heating with one of butane gas, fuel oil, alcohol or electricity.

21. The apparatus of claim 1 in which the operations employed in using the apparatus are at least partially automated.

22. Apparatus for thermal blast removal of coverings (peel, pod, shuck, skin, scale, shell, and the like) from food products comprising:
 (a) a pressure vessel having insulation mounted on an exterior surface thereof, of the shape of an oblong cylinder, mounted on a frame suitably for axial rotation in a horizontal position;
 (b) a base supporting said frame, by means of pivot means permitting tilting of said pressure vessel upward or downward with respect to the horizontal;
 (c) an open front end of said vessel being supported by support means;
 (d) a closure on said vessel having a central hole and being joined to a hollow shaft extending from said vessel through a supporting bearing;
 (e) means for rotating said vessel consisting of a motor, gear reduction box, and chain drive to a sprocket, said sprocket being keyed to said hollow shaft;
 (f) means for supplying gaseous heating medium to said pressure vessel by connection to said hollow shaft through a sealed swivel joint;

(g) a hinged, gasket-sealed head assembly for closing said open front end of said vessel, said hinge being equipped with tension springs and meshing gear linkage to accelerate opening speed of said head assembly initially, and to decelerate the speed of opening of said head assembly near a wide open position thereof;

(h) a shock absorbing head catch to further decelerate door swing and to prevent rebound of said head assembly into the pathway of discharging products;

(i) a special trip latch and a closing nut for sealing said vessel after it is charged with product and for triggering an explosion after heating said food products in said vessel;

(j) suitable means for catching said food product as it is blown from said vessel.

23. Apparatus as described in claim 22 in which said apparatus is equipped for application of heat to the external surface of said pressure vessel, said heat being applied by means of a suitable electric heater placed between said external surface of pressure vessel and said insulation, electric current for said electric heater being supplied by means of stationary carbon brushes in tangental contact with circular electrodes rotated on the same axis as that of said pressure vessel.

* * * * *

UNITED STATES PATENT AND TRADEMARK OFFICE
CERTIFICATE OF CORRECTION

PATENT NO. : 4,524,681
DATED : June 25, 1985
INVENTOR(S) : HARRIS ET AL.

It is certified that error appears in the above-identified patent and that said Letters Patent is hereby corrected as shown below:

<u>IN THE TITLE</u> line 2, delete "FEELING", insert --PEELING--.

<u>IN THE CLAIMS</u> claim 18, line 3, delete "mechanisms", insert --mechanism--.

claim 19, line 1, delete "17", insert --16--.

Signed and Sealed this

Fifteenth Day of October 1985

[SEAL]

Attest:

Attesting Officer

DONALD J. QUIGG

Commissioner of Patents and Trademarks—Designate